United States Patent
Tateishi et al.

(10) Patent No.: US 6,855,397 B1
(45) Date of Patent: Feb. 15, 2005

(54) IMAGE RECEIVING MATERIAL FOR ELECTROPHOTOGRAPHY

(75) Inventors: Tomomi Tateishi, Minami-Ashigara (JP); Yoshisada Nakamura, Minami-Ashigara (JP); Mitsuru Ito, Minami-Ashigara (JP); Masataka Murata, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/534,030

(22) Filed: Mar. 24, 2000

(30) Foreign Application Priority Data

Mar. 24, 1999 (JP) ............................................ 11-080342

(51) Int. Cl.$^7$ ............................ B32B 5/12; B32B 25/10; B31C 13/00; C08L 31/04; G03C 1/494
(52) U.S. Cl. .................... 428/195.1; 428/109; 428/137; 428/204; 428/297.1; 430/631; 493/49; 524/569; 427/121
(58) Field of Search ............................. 428/195.1, 109, 428/137, 144, 204, 297.1, 211, 195, 215, 334; 524/569; 430/631; 493/49; 427/121

(56) References Cited

U.S. PATENT DOCUMENTS

| | | | | |
|---|---|---|---|---|
| 5,683,785 A | * | 11/1997 | Talvalkar et al. | 428/195 |
| 5,998,074 A | * | 12/1999 | Miyamoto et al. | 430/106 |
| 6,103,042 A | * | 8/2000 | Hatada et al. | 156/235 |
| 6,387,478 B2 | * | 5/2002 | Fujimoto | 428/215 |

* cited by examiner

*Primary Examiner*—B. Hamilton Hess
*Assistant Examiner*—Lawrence Ferguson
(74) *Attorney, Agent, or Firm*—Birch, Stewart, Kolasch & Birch, LLP

(57) ABSTRACT

An image receiving material for electrophotography having, on a support, one or more structural layers including a toner image receiving layer, wherein at least one layer of said structural layers comprises plasticizer, and wherein a flow starting temperature of said toner image receiving layer is at 30° C. or higher that is, as well, lower than a temperature of a flow starting temperature of toner resin+10° C., is disclosed. Using the image receiving material can provide formation of toner reflected images similar to photographs with respect to smoothness (glossiness) and also provide no image degradation by image roughness or removal.

20 Claims, 1 Drawing Sheet

IMAGE RECEIVING MATERIAL FOR ELECTROPHOTOGRAPHY

BACKGROUND OF THE INVENTION

1. Field of the Invention

The present invention relates to an image receiving material for electrophotography for forming a reflected image and particularly to an image receiving material for electrophotography capable of forming a highly qualified toner reflected image similar to photography with respect to smoothness.

2. Description of Related Art

An electrophotographic method is an image forming method applying a photoconductive effect and electrostatic phenomenon, and the method is widely utilized in a variety of fields. The electrophotographic method has two kinds: one is to form an image on a semiconductor material itself such as zinc oxide paper; the other is to form an image by further transferring a toner image to a recording medium capable of receiving toner images. The latter, called a xerography method, is widely employed in copying machines for offices, and the image forming principle is described below.

First, electrostatic charges are placed in the dark on a photosensitive plate having a photoconductor such as selenium by using corona charge or the like, and when the charged plate is exposed to an original image, charges are dissipated only in irradiated portions to form a latent image where the charges remain. Negatively charged toners, after mixed with carriers and introduced to the latent image, are attracted to the latent image. Then, the image receiving material made of, for example, a paper is applied on the toners and the toners are transferred by heating to a recording medium to form an image on the recording medium.

In recent years, color copying machines are further widely used, and those color copying machines carry out the aforementioned method by utilizing color toners. Because the color copying machines are mostly used for copying images rather than letters, the images to be formed are sought to be clear and highly qualified. However, when color copying is made on a plain paper, clear and highly qualified images cannot be achieved. Particularly, inferiority of glossiness has been raised as a major problem. Thus, it has been sought to improve image receiving materials used for photography application.

SUMMARY OF THE INVENTION

It is an object of the invention to eliminate the aforementioned problems of the prior art. In other words, the invention provides, as an object to be accomplished, an image receiving material for electrophotography capable of forming a toner reflected image excelling in smoothness (glossiness) and serving as material for photography application. The invention further provides, as another object to be accomplished, an image receiving material for electrophotography capable of forming a highly qualified toner reflected image without degrading image quality caused by image roughness or removal.

The inventors diligently studied to solve the above problems, and they found that controlling a flow starting temperature of a toner image receiving layer can form highly qualified toner reflected image without image roughness and removal, and therefore the invention has been reached.

This invention provides an image receiving material for electrophotography having, on a support, one or more structural layers including a toner image receiving layer, in which at least one layer of the structural layers contains plasticizer, and in which a flow starting temperature of the toner image receiving layer is at 30° C. or higher that is, as well, lower than a temperature of a flow starting temperature of toner resin+10° C.

Plasticizer used in the image receiving material for electrophotography of the invention preferably has a logP value of 20 or lower, an (organic/inorganic) value of 6 or lower, a molecular weight of 150 to 20000, and a partial structure derived from ethylene oxide or propylene oxide. In addition, a toner image receiving layer of the image receiving material for electrophotography of the invention preferably contains one or more additives selected from a group consisting of a plasticizer, a charge controlling agent, electroconductive metal oxide, a fluoroorganic compound and additives for photography.

BRIEF DESCRIPTION OF THE DRAWINGS

The above and other objects and features of the invention are apparent to those skilled in the art from the following referred embodiments thereof when considered in conjunction with the accompanied drawings, in which.

DESCRIPTION OF THE PREFERRED EMBODIMENTS

Figure 1:
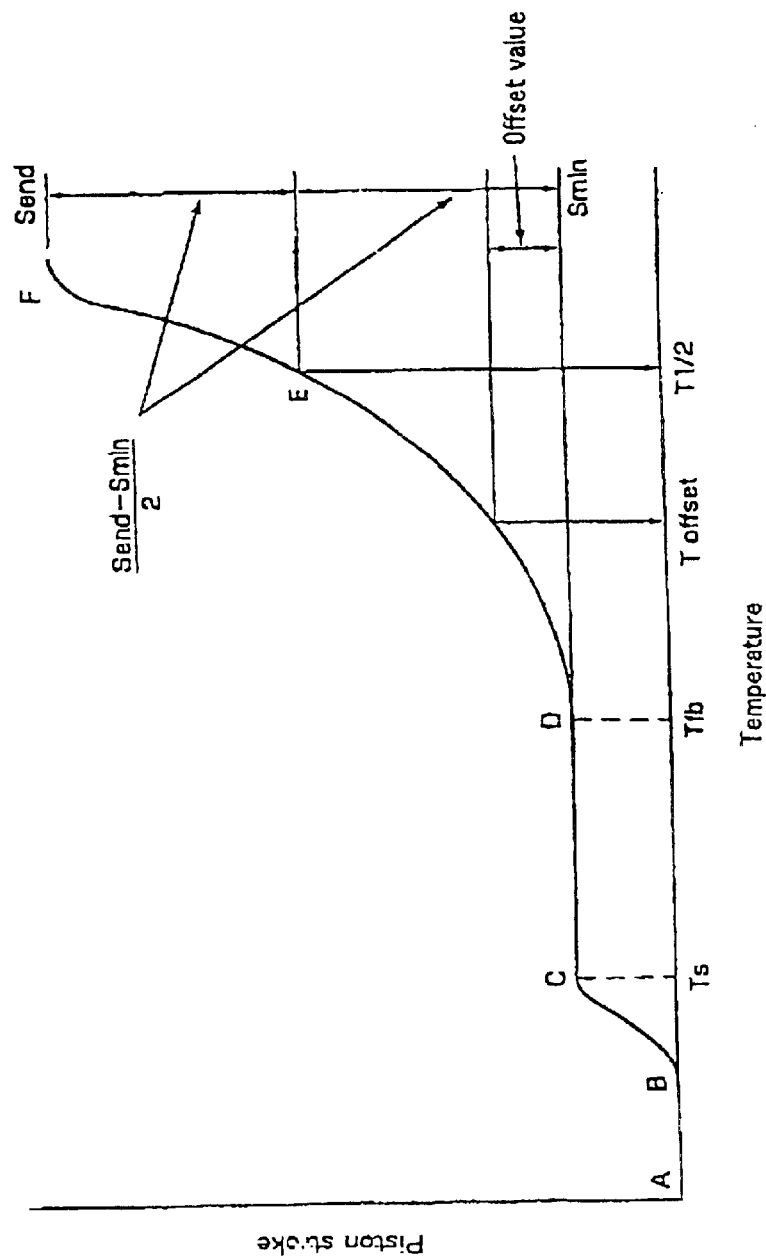
FIG. 1 is an illustration for deciding flow starting temperatures.

An image receiving material for electrophotography of the invention will be further explained in detail hereinafter.

The image receiving material for electrophotography of the invention is characterized in having a toner image receiving layer with a flow starting temperature of 30° C. or higher that is, as well, lower than a temperature of a flow starting temperature of toner resin+10° C. "Flow starting temperatures" referred in the specification are temperatures measured by a flow tester CFT. 500 D model manufactured by Shimidzu Corporation using a die (nozzle) having a diameter of 0.5 mm and a thickness of 1.0 mm under conditions of an extrusion load application of 50 kg and initial set temperature of 50° C. After preheating time of 300 seconds, a stroke of a piston is measured at each temperature while temperature is uniformly up at a rate of 5° C. per minute, and consequently a temperature at which a flow starts is designated as a flow starting temperature. According to attached FIG. 1, the temperature at D corresponds to a flow starting temperature. The inventors confirmed that a flow starting temperature is an important solid state property during toner fixation, and then they reached the invention by controlling the range of the flow starting temperature.

In the image receiving material for electrophotography of the invention, a flow starting temperature of the toner image receiving layer is not especially limited as long as the flow starting temperature is 30° C. or higher that is, as well, lower than the temperature of a flow starting temperature+10° C. The range of the temperature is preferably from 30 to 90° C., especially preferably from 35 to 85° C.

In the image receiving material for electrophotography of the invention, at least one layer of the structural layers is a layer containing plasticizer. "Plasticizer" as used here is a compound for facilitating fluidization and softening (referred to as "plasticization" hereinafter) of binder or solid components constituting layers by heating during toner fixation.

The image receiving material for electrophotography of the invention preferably uses plasticizer having a logP value of 20 or lower. The logP value is more preferably 15 or lower, and further preferably in a range of 0.70 to 15. The logP value of 21 or higher tends to reduce an effect improving smoothness (glossiness) when a toner reflected image is formed. A "logp value" used in the specification is calculated with a commercially available MacLogP Version2.0.3 (manufactured by Biobyte).

The (organic/inorganic) value of plasticizer used in the invention is preferably 6 or lower, and the lower limit is preferably 0.20 or higher. The (organic/inorganic) value of 7 or higher tends to reduce an effect improving smoothness (glossiness) when a toner reflected image is formed. Here, "organic" and "inorganic" are concepts for predicting a property of a compound, and the details of the concepts are described, for example, in "Yu-ki Gainenzu. Kiso to Ouyo.", or Organic Conceptual Diagram. Fundamentals and Applications., Ch. 1, p. 13 (Yoshio Kohda, published by Sankyo Syuppan). It is experimentally known that such solvent for dissolving organic compound is generally preferred as having an (organic/inorganic) value close to the (organic/inorganic) value of the organic compound.

The plasticizer used in the invention has a molecular weight of, preferably, 150 to 20000, further preferably, 200 to 10000, especially preferably 300 to 10000. The plasticizer having a molecular weight of less than 150 volatilizes and scatters or the like in the air during preservation, so this may cause air pollution. On the other hand, the plasticizer having a molecular weight of more than 20000 cannot fully plasticize the layer, so an effect improving smoothness (glossiness) of a toner reflected image formed tends to be lower.

The plasticizer is contained in at least one layer of the layers constituting the image receiving material for electrophotography of the invention. Thus, the plasticizer can be added to either layer of a toner image receiving layer, a protective layer, an interlayer, or an undercoating layer and the like. Preferable is the case where plasticizer is contained in a layer to which tension caused by filling of toner particles in an image receiving material is carried. In particular, the plasticizer is preferably contained in a layer to which strain caused by tension (physical strain such as elasticity or viscosity, strain by material balance at molecules, binder main chains, or pendant parts, or other strains) is carried, and within the layer, the plasticizer is preferably contained in portions capable of easing these tension or strain. For example, a toner image receiving layer, a layer adjacent to the toner image receiving layer, or a surface layer is desirable as containing the plasticizer. The plasticizer contained in a layer may be in a micro-scattered state, in a phase separating state with micro-sea island forms, or in a state of fully mixing and dissolving with the other component such as binder or the like.

The plasticizer should fulfill a function facilitating plasticization of binder or solid components constituting layers by heat during the toner fixation. Thus, thermophysical properties such as a flow starting point, a softening point, or a melting point of the plasticizer is desirably lower than a toner fixing temperature in a state of mixing with components constituting the layers. It is generally known that mixing two or more kinds of compounds makes thermophysical property temperature lowered. Commercially available electrophotographic printers have generally a toner fixing temperature of 100 to 170° C., but the temperature differs depending on conveying speeds, sizes of fixing part, types of paper to be passed, or the like. The thermophysical property of the plasiticizer of the invention is suitably selected depending on binder or other components constituting the layer. For example, a melting point is preferably 300° C. or lower, further preferably in a range from 0.100 to 250° C., especially preferably in a range from 0.100 to 200° C., and T1/2 method temperature of flow tester tests also has the same ranges mentioned above. Glass transition temperature is preferably 250° C. or lower, more preferably in a range from 0.100 to 200° C., especially preferably in a rage from 0.50 to 150° C.

Provided that a total weight of binder, plasticizer, and other components constituting a layer is 100% by weight, the adding amount of the plasticizer is preferably in a rage from 0.001 to 90% by weight, more preferably in a range from 0.1 to 60% by weight, especially preferably in a range from 1 to 40% by weight.

The plasticizer usable in the invention may be selected by referring to the followings: "Kagaku Binran" (ed. Chemical Society of Japan, published by Maruzen), "Katozai Sono Riron to Ouyo" (Kouichi Murai, published by Saiwai Shobo), "Katozai no Kenkyu, First volume", "Katozai no Kenkyu, Second volume" (ed. Kobunshi Kagaku Kyokai), "Binran Rubber Plastic Haigo Yakuhin" (ed. Rubber Digest Co.) or the like, and following are specific examples, but the invention is not limited to these compounds.

TABLE 1

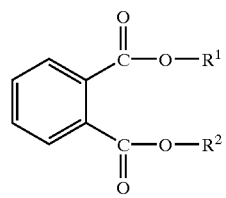

| No. | $R^1$ | $R^2$ | $\left(\dfrac{\text{Organic}}{\text{Inorganic}}\right)$ value | logP value | Molecular weight | Melting point (° C.) |
| --- | --- | --- | --- | --- | --- | --- |
| A-1 | $-C_2H_5$ | $-CH_2COOC_2H_5$ | 1.43 | 2.14 | 280 | 20 |
| A-2 | $\begin{array}{c}CH_3\\|\\-CHCOOC_2H_5\end{array}$ | $\begin{array}{c}CH_3\\|\\-CHCOOC_2H_5\end{array}$ | 1.41 | 2.35 | 366 | 50~53 |
| A-3 | $\text{-n-}C_8H_{17}$ | $-C_8H_{17}$ | 3.56 | 8.89 | 390.5 | −40 |

TABLE 1-continued

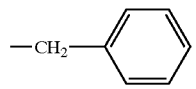

| No. | R¹ | R² | (Organic/Inorganic) value | logP value | Molecular weight | Melting point (° C.) |
|---|---|---|---|---|---|---|
| A-4 | —(CH$_2$)$_2$—CH=CH$_2$ | —(CH$_2$)$_2$—CH=CH$_2$ | 2.30 | 3.23 | 246 | |
| A-5 | —(CH$_2$)$_2$—OCH$_3$ | —(CH$_2$)$_2$—OCH$_3$ | 1.60 | 0.95 | 282 | |
| A-6 | -n-C$_4$H$_9$ | 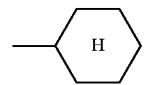 | 2.53 | 4.91 | 312 | |
| A-7 | 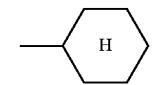 | 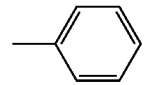 | 2.56 | 5.54 | 330 | 58~65 |
| A-8 | 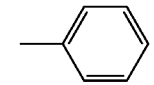 | 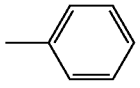 | 2.44 | 4.5 | 318 | 69 |

TABLE 2

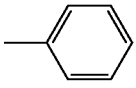

| No. | R³ | R⁴ | R⁵ | Organic/Inorganic | logP | M.W. | mp (° C.) |
|---|---|---|---|---|---|---|---|
| A-9 | 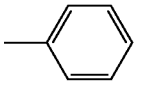 | 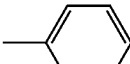 | 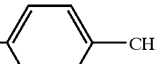 | 2.17 | 4.46 | 326 | 48.5 |
| A-10 | 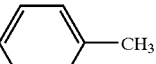 |  |  | 2.50 | 5.95 | 368 | 76 |
| A-11 | -n-C$_6$H$_{13}$ | -n-C$_6$H$_{13}$ | -n-C$_6$H$_{13}$ | 2.92 | 6.63 | 350 | |
| A-12 | —CH$_2$CH$_2$Cl | —CH$_2$CH$_2$Cl | —CH$_2$CH$_2$Cl | 1.25 | 0.47 | 285 | <−45 |
| A-13 | —CH$_2$—CHCH$_2$Cl (Cl) | —CH$_2$—CHCH$_2$Cl (Cl) | —CH$_2$—CHCH$_2$Cl (Cl) | 1.72 | 2.60 | 431 | 26.8 |
| A-14 | —CH$_2$CH$_2$—O—$^n$C$_4$H$_9$ | —CH$_2$CH$_2$—O—$^n$C$_4$H$_9$ | —CH$_2$CH$_2$—O—$^n$C$_4$H$_9$ | 1.52 | 4.02 | 398 | <−70 |
| A-15 | 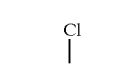 | 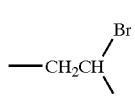 | 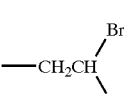 | 4.35 | 3.05 | 698 | −8 |

TABLE 3

(continued form Table 2)

| No. | R³ | R⁴ | R⁵ | Organic/Inorganic | logP | M.W. | mp (° C.) |
|---|---|---|---|---|---|---|---|
| A-16 | -n-$C_{16}H_{33}$ | -n-$C_{16}H_{33}$ | -n-$C_{16}H_{33}$ | 7.69 | 22.5 | 771 | 42 |
| A-17 | -n-$C_{18}H_{37}$ | -n-$C_{18}H_{37}$ | -n-$C_{18}H_{37}$ | 8.33 | 25.68 | 855 | 50 |
| A-18 | (cyclohexyl–cyclohexyl–cyclohexyl) | | | 2.38 | 5.63 | 344 | 60 |

TABLE 4

| No. | Structure | Organic/Inorganic | logP | M.W. | mp (° C.) |
|---|---|---|---|---|---|
| A-19 | Ph–COO–$CH_2$–(cyclohexyl)–$CH_2$OCO–Ph | 2.78 | 5.17 | 352 | 124~126 |
| A-20 | Ph–COO–$(CH_2)_3$–OCO–Ph | 2.77 | 3 | 284 | 47 |
| A-21 | Ph–COO–$(CH_2CH_2$–$O)_2$–OCO–Ph | 1.56 | 3.88 | 314 | |
| A-22 | Ph–COO-n–$C_{18}H_{37}$ | 6.67 | 11.1 | 375 | |
| A-23 | $CH_2$OCO–Ph / CHOCO–Ph / $CH_2$OCO–Ph | 2.08 | 5.34 | 404 | 71 |
| A-24 | $CH_3COO$–C($CH_2COOC_2H_5$)($CH_2COOC_2H_5$)–$COOC_2H_5$ | 0.77 | 1.7 | 318 | −50 |
| A-25 | $CH_3COO$–C($CH_2COOC_4H_9$)($CH_2COOC_4H_9$)–$COOC_4H_9$ | 1.12 | 4.87 | 402.5 | −80 |

TABLE 5

| No. | Structure | Organic/Inorganic | logP | M.W. | mp (° C.) |
|---|---|---|---|---|---|
| A-26 | pentaerythritol tetrabenzoate (CH₂OCOPh)₄ derivative with CH₂OCO-Ph (×3) and COO-Ph | 2.13 | 6.63 | 553 | 99 |
| A-27 | benzene-1,2,4-tricarboxylic acid trimethyl ester (H₃COOC-, -COOCH₃, -COOCH₃) | 1.23 | 1.45 | 252 | 38~40 |
| A-28 | CH₂OCO-n—C₁₇H₃₅<br>CHOCO-n—C₁₇H₃₅<br>CH₂OCO-n—C₁₇H₃₅ | 6.25 | 25.84 | 891 | 65 |
| A-29 | COO-n—C₁₂H₂₅<br>(CH₂)₂<br>COO-n—C₁₂H₂₅ | 4.76 | 12.06 | 455 | 38~40 |
| A-30 | n-C₁₇H₃₅COOCH₃ | 5.56 | 8.65 | 299 | 38~39 |
| A-31 | (CH₃)₂CHCOO—[H]—C(CH₃)₂—[H]—OCOCH(CH₃)₂ | 3.03 | 6.72 | 381 | 94~95 |
| A-32 | epoxycyclohexane with COO-n—C₁₈H₃₇ (×2) | 5.88 | 17.55 | 691 | 74~77 |

TABLE 6

| No. | Structure | Organic/Inorganic | logP | M.W. | mp (° C.) |
|---|---|---|---|---|---|
| A-33 | CH₃OCOCH₂—[spiro bis-dioxane]—CH₂COOCH₃ | 1.18 | −1.74 | 304 | 86~88 |
| A-34 | n-C₁₁H₂₃COOCH₂CH(OH)CH₂OH | 1.15 | 3.99 | 274 | 61~63 |
| A-35 | Ph-CH₂OCO-n—C₁₅H₃₁ | 5.88 | 9.37 | 347 | 52 |
| A-36 | (n-C₈H₁₇)₃—P=O | 7.14 | 9.63 | 387 | 50~52 |
| A-37 | (ClCH₂CH₂)₃—P | 1.63 | 0.69 | 269.5 | |
| A-38 | n-C₁₇H₃₅CON(CH₃)₂ | 2.94 | 7.66 | 312 | 40 |

TABLE 6-continued

| No. | Structure | Organic/Inorganic | logP | M.W. | mp (° C.) |
|---|---|---|---|---|---|
| A-39 | $\begin{array}{c} CH_3 \\ | \\ n\text{-}C_{11}H_{23}CO-N-CH_2COOH \end{array}$ | 1.02 | 4.84 | 271 | 44 |
| A-40 | n-$C_{14}H_{29}$OCO—$(CH_2)_2$—COOH | 1.72 | 6.8 | 314 | 59 |
| A-41 | n-$C_7H_{15}$COO—[bicyclic furan]—OCO-n-$C_7H_{15}$ | 2.21 | 6.48 | 398.5 | |

In addition, the present invention preferably uses plasticizer having a partial structure derived from ethylene oxide or propylene oxide. In the case of plasticizer having a partial structure derived from ethylene oxide, even the plasticizer having a molecular weight of over 2000 is preferably used. Preferable is a molecular weight raging from 200 to 200000, and especially preferable is a molecular weight raging from 200 to 20000.

Specifically, followings are raised as commercially available examples such as polyethylene glycols 200, 300, 400, 600, 1000, 1540, 2000, 4000, 6000, 20000, 70000, 500000, 2000000 and 4000000, or polypropylene glycols 400, 700, 1000, 2000 and 3000. Following compounds can also be raised, but the invention is not limited to those compounds.

TABLE 7

| No. | Structure | Organic/Inorganic | logP | M.W. |
|---|---|---|---|---|
| P-1 | $C_2H_5$—O—C(=O)—[benzene with $(OCH_2CH_2)_2$—O—$^nC_6H_{13}$ (×2)] | 1.76 | 7.23 | 527 |
| P-2 | [benzene with $CH_2$—$(OCH_2CH_2)_4$—OH (×2), Br] | 1.06 | 1.55 | 570 |
| P-3 | [benzene with $CH_2$—$(OCH_2CH_2)_3$—OH (×2), Br] | 1.04 | 1.42 | 481 |
| P-4 | $CH_2OCH_2CH_2OCHCH_2OCH_2$—[phenyl], $CH_2OCH_2CH_2OCH_2$ | 1.63 | 0.94 | 296 |
| P-5 | [3,5-dichlorobenzene]—C(=O)—$(OCH_2CH_2)_3$—O—n-$C_4H_9$ | 1.63 | 4.99 | 379 |

TABLE 7-continued

| No. | Structure | Organic/Inorganic | logP | M.W. |
|---|---|---|---|---|
| P-6 | (structure: 3,4-dimethylphenyl—(OCH$_2$CH$_2$)$_3$—O—n-C$_4$H$_9$) | 1.95 | 4.47 | 310 |
| P-7 | n-C$_4$H$_9$—(OCH$_2$CH$_2$)$_3$—OH | 1.45 | 0.97 | 206 |

TABLE 8

| No. | Structure | Organic/Inorganic | logP | M.W. |
|---|---|---|---|---|
| P-8 | n-C$_8$H$_{17}$—(OCH$_2$CH$_2$)$_3$—OH | 1.85 | 3.09 | 262 |
| P-9 | n-C$_{12}$H$_{25}$—(OCH$_2$CH$_2$)$_3$—OH | 2.25 | 5.20 | 319 |
| P-10 | CH$_2$—(OCH$_2$CH$_2$)$_2$—CH—O—CH$_2$—C$_6$H$_5$ <br> \| <br> CH$_2$—(OCH$_2$CH$_2$)$_2$—CH$_2$ | 1.47 | 0.20 | 384 |
| P-11 | H—[(OCH$_2$CH$_2$)$_2$—O—C(=O)—(CH$_2$)$_{10}$—C(=O)—(OCH$_2$CH$_2$)$_2$—OH]$_2$ | 1.07 | 6.75 | 707 |
| P-12 | H—(OCH$_2$CH$_2$)$_3$—O—C(=O)—(CH$_2$)$_n$—C(=O)—(OCH$_2$CH$_2$)—OH, n = 2 | 0.65 | −0.63 | 382 |
| P-13 | H—(OCH$_2$CH$_2$)$_3$—O—C(=O)—(CH$_2$)$_n$—C(=O)—(OCH$_2$CH$_2$)—OH, n = 4 | 0.70 | −0.32 | 411 |
| P-14 | H—(CH$_2$CH$_2$O)$_3$—O—C(=O)—CH(R)—C(=O)—(OCH$_2$CH$_2$)—OH, R = C$_2$H$_5$ | 0.66 | −0.14 | 396 |
| P-15 | H—(CH$_2$CH$_2$O)$_3$—O—C(=O)—CH(R)—C(=O)—(OCH$_2$CH$_2$)—OH, R = n-C$_4$H$_9$ | 0.71 | 0.91 | 425 |

TABLE 9

| No. | Structure | Organic/Inorganic | logP | M.W. |
|---|---|---|---|---|
| P-16 | H—(CH$_2$CH$_2$O)$_3$—O—C(=O)—CH(R)—C(=O)—(OCH$_2$CH$_2$)—OH, R = CH$_2$CH$_2$CH(CH$_3$)—CH$_3$ | 0.73 | 1.31 | 438 |
| P-17 | (methylenedioxybenzene with two CH$_2$—(OCH$_2$CH$_2$)$_2$—O—n-C$_4$H$_9$ substituents) | 1.73 | 4.15 | 471 |

TABLE 9-continued

| No. | Structure | Organic/Inorganic | logP | M.W. |
|---|---|---|---|---|
| P-18 | (cyclohexyl)–(OCH$_2$CH$_2$)$_2$–O–(cyclohexyl), (cyclohexyl)–(OCH$_2$CH$_2$)$_2$–O–(cyclohexyl) | 1.78 | 1.39 | 373 |
| P-19 | H$_{19}$C$_9$–(phenyl)–(OCH$_2$CH$_2$)$_4$–CH$_2$CH$_2$SO$_3$Na | 1.06 | 5.81 | 533 |

Following compounds can be used, such as esters (for example, phthalic acid esters, phosphoric esters, fatty acid esters, abietic acid esters, avidin acid esters, sebacic acid esters, azelaic acid esters, benzoic esters, butyric acid esters, epoxidation fatty acid esters, glycolic acid esters, propionic acid esters, trimerit acid esters, citric acid esters, sulfonic acid esters, carboxylic acid esters, succinic acid esters, maleic acid esters, fumaric acidesters, phthalic acid esters, stearic acid esters or the like), amides (for example, fatty acidamides, sulfoamides or the like), ethers, alcohols, paraffins, lactones, polyethylene oxys, silicone oils, fluorine compounds or the like described in each of publications, in which a plasticizer is referred to as a high boiling point organic solvent, a thermal solvent or the like, including Japanese Unexamined Patent Publication (KOKAI) Showa No. 59-83154, Japanese Unexamined Patent Publication (KOKAI) Showa No. 59-178451, Japanese Unexamined Patent Publication (KOKAI) Showa No. 59-178453, Japanese Unexamined Patent Publication (KOKAI) Showa No. 59-178454, Japanese Unexamined Patent Publication (KOKAI) Showa No.59-178455, Japanese Unexamined Patent Publication (KOKAI) Showa No. 59-178457, Japanese Unexamined Patent Publication (KOKAI) Showa No. 62-174754, Japanese Unexamined Patent Publication (KOKAI) Showa No. 62-245253, Japanese Unexamined Patent Publication (KOKAI) Showa No. 61-209444, Japanese Unexamined Patent Publication (KOKAI) Showa No. 61-200538, Japanese Unexamined Patent Publication (KOKAI) Showa No. 62-8145, Japanese Unexamined Patent Publication (KOKAI) Showa No. 62-9348, Japanese Unexamined Patent Publication (KOKAI) Showa No. 62-30247, Japanese Unexamined Patent Publication (KOKAI) Showa No. 62-136646, Japanese Unexamined Patent Publication (KOKAI) Showa No. 62-174754, Japanese Unexamined Patent Publication (KOKAI) Showa No. 62-245253, Japanese Unexamined Patent Publication (KOKAI) Showa No. 61-209444, Japanese Unexamined Patent Publication (KOKAI) Showa No. 61-200538, Japanese Unexamined Patent Publication (KOKAI) Showa No. 62-8145, Japanese Unexamined Patent Publication (KOKAI) Showa No. 62-9348, Japanese Unexamined Patent Publication (KOKAI) Showa No. 62-30247, Japanese Unexamined Patent Publication (KOKAI) Showa No. 62-136646, and Japanese Unexamined Patent Publication (KOKAI) Heisei No. 2-235694.

In addition, low molecular weight products of polymers described below may be used. Commercially available are Adekacizers PN-170, PN-1430 manufactured by Asahi Denka logyo K.K, PARAPLEX-G-25, G-30, G-40 manufactured by C.P. HALL Co. Ltd., and Ester gum 8L-JA, Ester R-95, Pentalin 485LFK115, 4820, 830, Lewizole 28-JA, Picolastic A-75, Picotex LC, Crystalex 3085 manufactured by Rika Hercules, or the like.

Aforementioned products can be used for the purposes of adjusting slippery property (carrier property improvement by lower frictional force), improving fixing-part offset (releasing of toner or layers to fixing parts), adjusting curl balance, adjusting electrification (formation of toner electrostatic images) or the like.

Virtually any material may be used as a support used in the image receiving material for electrophotography of the invention as long as the material can resist the fixing temperature, and satisfy such matters as smoothness, whiteness degree, slippery property, friction property, antistatic property, or dents after fixation or the like. Generally, supports for electrophotography such as papers, synthetic polymers (films) or the like can be used as described in "Shashinkogaku no Kiso-Ginen" pp. 223 to 240, ed. Nihon Shyasin Gakkai (Corona Publishing Co., Ltd, 1979). Specific examples to be used include paper supports such as quality papers, art papers, coated papers, cast-coated papers, mixed paper produced from pulp of synthetic resins such as polyethylene or the like and natural pulp, yankee papers, baryta papers, wallpapers, guard papers, synthetic resin or emulsion impregnated papers, synthetic rubber latex impregnated papers, synthetic resin-innerly added papers, paperboards, cellulose fiber papers, polyolefin coated papers (especially coated on the double sides with polyethylene) or the like, respective plastic film or sheet such as polyolefin, polyvinyl chloride, polyethylene terephthalate, polystyrene metacrylate, polyethylene naphthalate, polycarbonate, polyvinyl chloride, polystyrene, polypropylene, polyimide, celluloses (for example, triacetyl cellulose) or the like and the films and sheets with aforementioned plastics subjected to treatments for providing white reflexiveness (for example, a treatment for providing a film with pigment such as titanium oxide), cloth, metals, glasses or the like. These can be used alone, or used as a support laminated on one side or double sides with synthetic polymers such as polyethylene or the like. Also, a multilayer support formed by an arbitrary combination of the above supports can be used. Other usable supports are described in Japanese Unexamined Patent Publication (KOKAI) Showa No. 62-253159; pp. 29 to 31, Japanese Unexamined Patent Publication (KOKAI) Heisei No. 1-61236; pp.14 to 17, Japanese Unexamined Patent Publication (KOKAI) Showa No. 63-316848, Japanese Unexamined Patent Publication (KOKAI) Heisei No. 2-22651, Japanese Unexamined Patent Publication (KOKAI) Heisei No. 3-56955, and U.S. Pat. No. 5,001,033.

The support of the image receiving material for electrophotography has generally a thickness of 25 to 300. m, preferably 50 to 260. m, and especially preferably 75 to 250. m.

The structural layer of the support may be added with various types of suitably selected additives within a range which does not impair the object of the invention. For example, pigments or dyes such as a whitener, a conductive agent, a filler, titanium oxide, ultramarine, or carbon black may be, if necessary, contained.

In addition, one side or both sides of the supports can be subjected to various types of surface treatments or base coatings for improving adhesion to the layer to be formed on the support. The surface treatments include, for example, printing processing for gloss surfaces, micro fine surfaces as described in Japanese Unexamined Patent Publication (KOKAI) Showa No. 55-26507, matte surfaces or tweed surfaces, as well as activation processings such as corona discharge processing, flame processing, glow discharge processing or plasma processing. As a base coating, the method described in Japanese Unexamined Patent Publication (KOKAI) Showa No. 61-846443, for example, can be utilized. These processings may be carried out alone, or arbitrarily combined together such that activation processing is made after printing process, or base coating is further made after surface treatment such as activation processing.

In the structure of these supports, at the surfaces or back surfaces and in those combinations, semiconductive metal oxide such as hydrophilic binder, aluminasol, or tin oxide, carbon black, and other antistatic agents may be applied. Specifically, the support described in Japanese Unexamined Patent Publication (KOKAI) Showa No. 63-220246 can be used.

The image receiving material for electrophotography of the invention includes a toner image receiving layer, and two or more toner image receiving layers may be formed in the image receiving material for electrophotography of the invention.

The toner image receiving layer may be formed on only one side, or both sides of the support. The image receiving material for electrophotography having a toner image receiving layer on one side can be widely used when one side printing is made such as posters, pictures, printing seals having an adhesive layer on the back side. The image receiving material for electrophotography having toner image receiving layers on both sides, on the other hand, can be printed on the both sides, so the image receiving material can be widely applied to, for example, cards, postcards, brochures, fliers or the like.

The thickness of the toner image receiving layer as a whole is preferably in a range from 0.1 to 500. m, and especially preferably in a range from 1 to 200. m. When the toner image receiving layer has a thickness of less than 0.1. m, toners cannot be retained after fixation, so image defects tend to easily occur. On the other hand, when the toner image receiving layer has a thickness of more than 500. m, texture feeling as photograph tends to be inferior.

The preferable toner image receiving layer is a layer attracting toners, fixing the toners by heating in fixation, containing retainable material (hereinafter referred to as "toner-receiving material") alone, or together with the binder materials, having a thickness of 0.1 to 100. m.

Representative examples of the toner-receiving material are polymers including polymer having ester linkages; polyurethane resin; polyamide such as urea resin or the like; polysulfone resin; polyvinyl chloride resin, polyvinylidene chloride resin, vinyl chloride. vinyl acetate copolymer resin, vinyl chloride. vinyl propionic acid copolymer resin; polyol resin such as polyvinyl butyral or the like, ethyl cellulose resin, cellulose resin such as cellulose acetate resin or the like; polycaprolactone resin, styrene. maleic anhydride resin, polyacrylonitrile resin, polyether resin, epoxy resin, phenol resin; polyethylene resin, polyolefin resin such as polypropylene resin or the like, copolymer resin of olefin such as ethylene, propylene or the like with other vinyl monomer, acrylic resin, or the like. The toner-receiving material may be used alone, or in combination with one another.

Toner-receiving material containing polyester resin is preferable, and especially preferable is the toner-receiving material containing polyester resin of 20% by weight or higher. Examples of resin having ester linkages include: polyester resin obtained by condensation of dicarboxylic acid components (sulfonic acid group, carboxyl group or the like can be substituted in these dicarboxylic acid components) such as terephthalic acid, isophthalic acid, maleic acid, fumaric acid, phthalic acid, adipic acid, sebacic acid, azelaic acid, abietic acid, succinic acid or the like with alcohol components (hydroxy group or the like can be substituted in these alcohol components) such as ethylene glycol, diethylene glycol, propylene glycol, bisphenol A, bisphenol S, 2. ethyl cyclohexyl diethanol, neopentyl glycol or the like; polyacrylic acid ester resin or polymethacric acid ester resin such as polymethyl methacrylate, polybutyl methacrylate, polymethyl acrylate, polybutyl acrylate or the like; polycarbonate resin; polyvinyl acetate resin; styrene acrylate resin, styrene. methacric acid ester copolymer resin, vinyl toluene acrylate resin; or the like. Specific examples raised are described respectively in Japanese Unexamined Patent Publication (KOKAI) Showa No. 59-101395, Japanese Unexamined Patent Publication (KOKAI) Showa No. 63-7971, Japanese Unexamined Patent Publication (KOKAI) Showa No. 63-7972, Japanese Unexamined Patent Publication (KOKAI) Showa No. 63-7973, and Japanese Unexamined Patent Publication (KOKAI) Showa No. 60-294862. Following commercial products can be used such as VYLON 290, VYLON 200, VYLON 280, VYLON 300, VYLON 103, VYLON GK. 140, and VYLON GK. 130 manufactured by Toyobo Co., Ltd., TUFTONE NE. 382, TUFTONE U. 5, ATR. 2009, and ATR. 2010 manufactured by Kao Corporation, Elitel UE 3500, UE 3210, and XA. 8153 manufactured by Unitika Ltd., Polyester TP. 220, and R. 188 manufactured by Nippon Synthetic Chemical Industry Co., Ltd, or the like.

The toner image receiving layer containing the toner-receiving material may be formed by dispersion of toner-receiving material in water-soluble binder and carrying of the toner-receiving material. As a method for dispersing the toner-receiving material into the water-soluble binder, any of the known dispersing method where hydrophobic material is dispersed in water-soluble polymer can be used. As representative methods, followings can be raised such as a method for emulsifying and dispersing liquid, which has toner-receiving material dissolved with water and a nonmiscible orgnanic solvent, mixed with solution of water-soluble binder, a method for mixing latex of the toner-receiving material (polymer) with solution of the water-soluble binder, or the like.

The known water-soluble polymers can be used as water-soluble binders. In particular, it is preferable to select water-soluble binder having crosslinkable group by hardener, and polyvinyl alcohol and gelatins are especially preferable. In the water-soluble binder, coating is made as the grain form of the toner-receiving material remains as it is, and in that case, it is preferable to select the material from those forming a coat at a temperature of thermal fixation of toners.

The water-soluble polymer has no limitation with respect to the composition, bonding structure, molecular weight, molecular weight distribution, and figure as long as it is polymer with water soluble characteristic. Examples of the water soluble groups of the water-soluble polymers include hydroxy groups, carboxylic acid groups, amino groups, amido groups, ether groups or the like.

The examples of the water-soluble polymers described in Research Disclosure No. 17643, p. 26; No. 18,716, p.307; No. 307,105, pp. 873 to 874, and Japanese Unexamined Patent Publication (KOKAI) Showa No. 64-13546, pp. 71 to 75. Specifically, vinylpyrrolidone. vinyl acetate copolymer, styrene vinylpyrrolidone copolymer, styrene maleic anhydride copolymer, water-soluble polyester, water-soluble polyurethane, water-soluble nylon, and water-soluble epoxy resin.

Water dispersion type resin such as water dispersion acrylic resin, water dispersion polyester resin, water dispersion polystyrene resin, water dispersion urethane or the like, emulsion such as acrylic resin emulsion, polyvinyl acetate emulsion, SBR (styrene-butadiene rubber) emulsion or the like, or these coplymers, mixtures, or aqueous solutions such as cation denatured substance can be suitably selected and used alone or in combination of one another. Gelatin is selected from lime treatment gelatin, acid treatment gelatin, or decalcified gelatin or gelatin having a reduced amount of calcium or the like can be used alone or in combination with one another.

As a commercially available product of the water dispersion polyester, for example, VYLONAL MD-1250, MD-1930 manufactured by Toyobo Co., Ltd., PLASCOAT Z. 446, Z. 465, RZ. 96 manufactured by GOO Chemical Co., Ltd., ES. 611, ES. 670 manufactured by Dainippon Ink And Chemicals, Incorporated, and Pes-resin A. 160 A, A. 210, A. 620 manufactured by Takamatsu Oil & Fat Co., Ltd. may be raised.

Coat forming temperature of the water-soluble polymer is preferably at room temperature or higher with respect to preprinting preservation and at 100° C. or lower with respect to fixation of toner particles.

These water-soluble polymers can be used as binder in not only a toner image receiving layer but also other structural layer, or used as an adhesive for improving adhesion.

The toner image receiving layer preferably contains one or more additives selected from a group consisting of plasticizer, charge controlling agent, electroconductive metal oxide, fluoroorganic compound and additives for photograph.

Conventionally known antistatic agents can be used as a charge controlling agent, and polyelectrolytes and electroconductive metal oxides may be used in addition to surfactants such as cationic based surfactants, anionic based surfactants, amphoteric surfactants, and nonionic based surfactants. For example, followings can be used, but not limited to, a cationic based antistatic agent such as quaternary ammonium salt, polyamine derivative or the like, an anionic based antistatic agent such as cation denatured polymethyl methacrylate, cation denatured polystyrene, alkyl phosphate or the like, a nonionic based antistatic agent such as anionic based polymer, fatty acid ester or the like.

The electroconductive metal oxides usable as a charge controlling agent include $ZnO$, $TiO_2$, $SnO_2$, $Al_2O_3$, $In_2O_3$, $SiO_2$, $MgO$, $BaO$ and $MoO_3$. These may be used alone, or the composite oxide of those above may be used. In addition, these metal oxides can further contain heterogeneous elements, for example, Al, In or the like with respect to ZnO, Nb, Ta or the like with respect to $TiO_2$, Sb, Nb, halogen element or the like with respect to $SnO_2$, by doping or the like.

The toner image receiving layer has preferably surface electric resistance in a range of $1.\ 10^6$ to $1.\ 10^{15}$ under the condition at 25° C. and RH of 65%. When the electric resistance is less than $1.\ 10^6$., the density of the resulting toner images tends to become low due to an insufficient amount of toners to be transferred to the toner image receiving layer. On the other hand, when the electric resistance is over $1.\ 10^{15}$., the density of the images tends to become low since more than a required amount of electric charges are produced, resulting in that toners are not sufficiently transferred. In other words, the image receiving material for electrophotography is electrostatically charged during treated, so it is easy to be attached by dusts. Also, misfeeding, double sending, discharge mark, toner transferring lacking or the like is easy to occur during copying operation. The heat-resistant layer containing water-soluble polymer is not necessarily subjected to electrification adjustment.

Additives for photography may be used in a blank sheet, a water-resistant layer, a blank sheet coating layer, a protective layer, a toner image receiving layer, a cushion layer, an undercoating layer, a heat insulating layer, a porous layer, a heat-resistant layer, an adhesive layer, a curl adjusting layer or the like which constitute the image receiving material for electrophotography of the invention.

Specific examples of the additives for photography are described in the following pages of Research.Disclosure (hereinafter abbreviated as "RD") No. 17643 (December 1978), No. 18716 (November, 1979), No. 307105 (November, 1989).

TABLE 10

| Kinds of Additives | RD17643 | RD18716 | RD307105 |
|---|---|---|---|
| Whitener | Page 24 | Page 648 Right column | Page 868 |
| Stabilizer | Page 24~25 | Page 649 Right column | Page 868~870 |
| Photo absorber, UV absorber | Page 25~26 | Page 649 Right column | Page 873 |
| Dye-Image Stabilizer | Page 25 | Page 650 Right column | Page 872 |
| Hardener | Page 26 | Page 651 Left column | Page 874~875 |
| Binder | Page 26 | Page 651 Left column | Page 873~874 |
| Plasticizer, Lubricant | Page 27 | Page 650 Right column | Page 876 |
| Coating assistant agent, Surfactant | Page 26~27 | Page 650 Right column | Page 875~876 |
| Antistatic agent | Page 27 | Page 650 Right column | Page 876~877 |
| Matte agent | — | — | Page 878~879 |

The structural layer of the image receiving material for electrophotography of the invention may be added with organic and, or inorganic micro particles (abbreviated as "matte agent"). The matte agent is added for preventing blocking, improving slippery property, preventing electrification, improving releasing property, improving the white background and curls, and adjusting moisture image receiving material as a whole, or the like.

It is preferable to use a matte agent having a diameter of 0.001 to 50 $\mu$m, especially preferable to use a matte agent having a diameter of 0.05 to 30 $\mu$m in the invention. It is desirable to decide an average particle size of the matte agent depending on the thickness of the heat-resistant layer. For example, provided that a thickness of the heat-resistant layer is 10, an average particle size of the matte agent is preferably 0.01 to 500, more preferably 0.1 to 300, especially preferably 0.5 to 100. The matte agent may exist on the surface or inside of the heat-resistant layer. The coating amount of the matte agent is preferably from 0.001 to 20 g/m$^2$, more preferably from 0.003 to 10 g/m$^2$, and especially preferably from 0.005 to 5 g/m$^2$.

The known matte agents can be used; for example organic and, or inorganic micro particles described in Japanese Unexamined Patent Publication (KOKAI) Heisei No. 5.262055 can be used as matte agents. Specifically organic matte agents include melanin resin particles, melanin. formaldehyde copolymer particles, polyolefin resin particles such as polymethylmethacrylate particles, polyethylene particles or the like of the compounds described in Japanese Unexamined Patent Publication (KOKAI) Showa No. 61. 88256, p. 29, styrene resin particles, crosslinked polymethylmethacrylate particles and crosslinked polystyrene particles having improved heat-resistant property and abrasion resistant property by crosslinking, in addition to such compounds as benzoguanamine resin particles, polycarbonate resin particles, ABS resin particles described in Japanese Unexamined Patent Publication (KOKAI) Showa No. 63. 274944 and Japanese Unexamined Patent Publication (KOKAI) Showa No. 63. 274952. Examples of the inorganic matte agents include oxides (for example, titanium dioxide, silicon dioxide or the like), alkaline-earth metal salts (for example, hydrosulfate or carbonate, more specifically barium sulfate, calcium carbonate or the like), silver halide particles which does not form images (for example, silver chloride, silver bromide or the like), or glasses.

The layers constituting the image receiving material for electrophotography of the invention may be harden by hardeners. When hardening organic solvent based polymer, hardeners described in Japanese Unexamined Patent Publication (KOKAI) Showa No. 61. 199997, Japanese Unexamined Patent Publication (KOKAI) Showa No. 58. 215398 or the like can be used. With respect to polyester resin, using isocyanate based hardeners is especially preferable. With respect to water-soluble polymers, the hardener in Table 11 is preferably used.

The image receiving material for electrophotography of the invention may contain a fluoroorganic compound, as a coating assistant agent, for improving slippery property, preventing electrification, improving releasing property or the like. As representative examples of fluoroorganic compounds include fluorine based surfactants, oil fluorine compounds such as fluorine oil or the like, hydrophobic fluorine compounds of solid fluorine compound resin or the like such as ethylene tetrafluoride resin or the like described in Japanese Patent Publication (KOKOKU) Showa No. 57. 9053, Column 8 to 17; Japanese Unexamined Patent Publication (KOKAI) Showa No. 61. 20944; Japanese Unexamined Patent Publication (KOKAI) Showa No. 62. 135826 or the like.

The image receiving material for electrophotography of the invention may contain a heat-resistant layer.

As a heat-resistant layer, any material can be used as long as it can resist a fixing temperature, but the layer containing water-soluble polymer is preferable, and especially more preferable is the layer containing water-soluble polymer of 10% by weight or higher. The mentioned polymers or water-soluble polymers for toner image receiving layer, or other organic solvent-soluble polymers or water-soluble polymers can be used as binder or main components constituting the layer. The preferable water-soluble polymer is the water-soluble polymer having a group crosslinkable by hardeners, and especially preferable is polyvinyl alcohol and gelatins.

The image receiving material for electrophotography of the invention may have two or more heat-resistant layers. The thickness of the heat-resistant layer or layers is 0.01 to 50. m as a whole, more preferably in a range from 0.05 to 20. m.

The method for forming layers constituting the image receiving material for electrophotography of the invention is not especially limited. A layer is formed by coating and drying the composition prepared by using aforementioned materials and further adding a variety of assistant agents, or by dissolving or dispersing suitable solvents, wherein coating methods known in the art can be used such as, for example, a blade coating method, an air knife coating method, a gravure coating method, a squeeze coating method, a roller coating method, a spray coating method, a dip coating method, a bar coating method or the like. The image receiving material for electrophotography of the invention produced by any of production methods is comprised in the scope of the invention as long as the material satisfies the conditions in the claims according to the invention.

A form of the image receiving material for electrophotography of the invention is not especially limited as long as the material can carry out recordings by using electrophotography, but preferable is a sheet form. In addition, the image receiving material for electrophotography of the invention is preferably for color electrophotography.

An electrophotographic method can form images in the image receiving material for electrophotography of the invention, and the electrophotographic method to be employed is not especially limited. The electrophotographic methods include, but not limited to, the methods described in "Denshi Shashin Gijyutsu no Kiso to Oyo" (Fundamentals and Applications for Electrophotography) and "Denshi Shashin Gijyutsu no Kiso to Oyo 2" (Fundamentals and Applications for Electrophotography $2^{nd}$) edited by Denshi Shashin Gakkai, published by Corona Publishing Co., Ltd.

In addition, a type, a method or the like of the toners used in the electrophotographic method is not limited. For example, known toners for color electrophotographic method can be used, and it is preferable to form images with three colors constituted of yellow, magenta, and cyan, or with four colors constituted of those three colors and black. Furthermore, two or more toners having different densities of respective colors can be used. Also, transparent or white toners can be used.

Furthermore, toners having a UV absorbability, or toners containing various additives raised above as additives for the toner image receiving layer may be used. For example, the toner containing an anti-color fading agent provides an advantage capable of forming toner images excelling in an image preserving property. It may be possible to use two or more toners which are reacted to develop some functions. Furthermore, the toner having a higher softening point than others may be used together as, what is called, a matte agent. It also may be possible that effective density is changed to form a part of the gradation by using toners having different contact angles with respect to the toner image receiving layer in a melting state and controlling the spreading of each toner during fixation.

EXAMPLES

The present invention will now be described in details with reference to the following examples. Materials, utilization amounts, proportions, operations or the like shown in the following examples can be suitably changed as long as they are not deviated from the effect of the invention. Thus, the scope of the invention is not limited to the examples shown below.

Note, in the examples and comparative examples, "%" and "parts" indicates "% by weight" and "parts by weight" respectively.

Manufacturing Examples

Manufacture process of a support A used in examples is shown in the present manufacturing examples.

Support A was prepared by using materials shown in Table 11 described below. Polyethylene layers (PE layers) were formed on the both sides of a quality paper, and the both sides were subjected to corona discharge treatment. Then, the back surface was coated with composition for back layers by using a wire coater and then dried to form a back layer, and the surface was coated with composition for surface undercoating layer and then dried to form a surface undercoating layer. Thus, a support A was prepared by corona discharge treatment.

TABLE 11

| Layer name | Structure of Substrate A | | Film thickness ($\mu$m) |
|---|---|---|---|
| Surface under-coating Layer | Gelatin | | 0.1 |
| Surface PE layer (Glossy) | Low density polyethylene (Density 0.923) | 50 Parts | 26 |
| | High density polyethylene (Density 0.955) | 50 Parts | |
| Pulp layer | High quality paper (LBKP/NBSP = 6/4, Density 1.053) | | 152 |
| Back surface PE layer (Matte) | Low density polyethylene (Density 0.923) | 35 Parts | 23 |
| | High density polyethylene (Density 0.955) | 65 Parts | |
| Back layer | Polyester resin (VYLONAL MD-1930, manufactured by Toyobo Co., Ltd.) | 63 Parts | 0.1 |
| | Matte agent (EPOSTER L15, manufactured by Nippon Shokubai Co., Ltd.) | 35 Parts | |
| | Surfactant (Chemical formula 1) | 2 Parts | |
| | | | 201.2 |

Coating liquid for forming the surface undercoating layer shown in Table 11 was made using following composition.

| | |
|---|---|
| Gelatin | 5 g |
| Water | 95 g |

Coating liquid for forming the back layer shown in Table 11 was made using following composition (0.5 g/m² after dried).

| | |
|---|---|
| Polyester resin (VYLONAL MD- 1930 manufactured by Toyobo Co., Ltd.) | 90 g |
| Matte agent (EPOSTER L15 manufactured by Nippon Shokubai Co., Ltd.) | 50 g |
| Surfactant (Chemical formula 1) | 3 g |
| Water | 10000 g |

The surfactant used in Table 11 and aforementioned composition was a compound having a following structure.

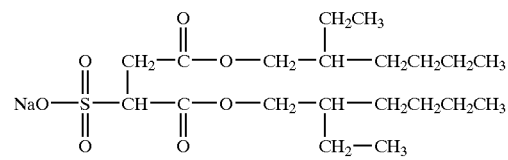

Examples and Comparative Examples

A support A prepared in the manufacturing example, a support B made of Mirrorcoat.Platinum (manufactured by Oji paper Co., Ltd.), a support C made of Whitemirrorcoat Cover. Platinum (manufactured by Oji paper Co., Ltd.), and a support D made of (N) Espritcoat C (manufactured by Nippon Paper Industries Co., Ltd.) were coated with composition for toner image receiving layers by using a wire coater and then dried, so image receiving materials for electrophotography were prepared.

The composition for toner image receiving layer is shown as followed.

| | |
|---|---|
| Polyester resin (TUFTONE U-5 manufactured by Kao Corporation) | 100 g |
| Plasticizer (shown in Table 6 to 10) | y g |
| Titanium dioxide (TIPAQUE$^R$ A-220 manufactured by Ishihara Sangyo Kaisha, Ltd.) | 15 g |
| Methyl ethyl ketone (hereinafter abbreviated as MEK) | 400 g |

The support A was used for preparing the image receiving materials for electrophotography shown in Table 12 and Table 13.

TABLE 12

| No. | Plasticizer No. | (Organic/Inorganic) | Log P value | molecular weight | Adding amount Y(g) | Gloss degree at 45° C. White | Gloss degree at 45° C. Grey | Gloss degree at 45° C. Black | Glossiness | Photographic | Flow Starting Temperature (° C.) |
|---|---|---|---|---|---|---|---|---|---|---|---|
| Example 1 | A-1 | 1.43 | 2.14 | 280 | 1 | 90 | 75 | 85 | Δ | Δ | 83.2 |
| Example 2 | A-1 | 1.43 | 2.14 | 280 | 20 | 89 | 85 | 90 | ○ | ○ | 70.3 |
| Example 3 | A-1 | 1.43 | 2.14 | 280 | 50 | 91 | 78 | 85 | ○ | Δ | 53.3 |
| Example 4 | A-5 | 1.60 | 0.95 | 282 | 20 | 85 | 79 | 87 | ○ | ○ | 72.0 |
| Example 5 | A-8 | 2.44 | 4.60 | 318 | 20 | 95 | 70 | 94 | Δ | ○ | 79.1 |
| Example 6 | A-9 | 2.17 | 4.46 | 326 | 20 | 93 | 83 | 90 | ○ | ○ | 71.5 |
| Example 7 | A-12 | 1.25 | 0.47 | 285 | 20 | 90 | 80 | 88 | ○ | ○ | 73.2 |
| Example 8 | A-13 | 1.72 | 2.60 | 431 | 20 | 89 | 68 | 92 | Δ | Δ | 80.8 |
| Example 9 | A-19 | 2.78 | 5.17 | 352 | 20 | 89 | 83 | 93 | ○ | ○ | 71.9 |
| Example 10 | A-23 | 2.08 | 5.34 | 404 | 20 | 90 | 82 | 89 | ○ | Δ | 65.8 |
| Example 11 | A-24 | 0.77 | 1.70 | 318 | 20 | 92 | 85 | 89 | ○ | ○ | 69.9 |
| Example 12 | A-27 | 1.23 | 1.45 | 252 | 20 | 93 | 72 | 90 | Δ | ○ | 79.5 |
| Example 13 | A-29 | 4.76 | 12.06 | 455 | 20 | 92 | 71 | 89 | Δ | Δ | 82.0 |
| Example 14 | A-32 | 5.88 | 17.55 | 691 | 20 | 85 | 65 | 88 | Δ | Δ | 83.0 |
| Example 15 | A-33 | 1.18 | -1.74 | 304 | 20 | 88 | 75 | 87 | ○ | Δ | 67.0 |
| Example 16 | A-35 | 5.88 | 9.73 | 347 | 20 | 90 | 65 | 91 | Δ | Δ | 78.9 |
| Example 17 | A-36 | 7.14 | 9.63 | 387 | 20 | 89 | 66 | 90 | Δ | ○ | 77.8 |
| Example 18 | A-37 | 1.63 | 0.69 | 269.5 | 20 | 91 | 80 | 92 | ○ | ○ | 71.3 |
| Comparative example 1 | — | — | — | — | None | 92 | 51 | 90 | X | X | 98.1 |
| Comparative example 2 | A-16 | 7.69 | 22.5 | 771 | 20 | 93 | 40 | 92 | X | X | 83.0 |
| Comparative example 3 | A-17 | 8.33 | 25.68 | 855 | 20 | 90 | 50 | 91 | X | X | 70.1 |
| Comparative example 4 | A-28 | 6.25 | 25.84 | 891 | 20 | 87 | 59 | 89 | Δ | X | 82.0 |

TABLE 13

| No. | Plasticizer No. | (Organic/Inorganic) | Log P value | Molecular weight | Adding amount Y(g) | Gloss degree at 45° C. White | Gloss degree at 45° C. Grey | Gloss degree at 45° C. Black | Glossiness | Photographic | Flow Starting Temperature (° C.) |
|---|---|---|---|---|---|---|---|---|---|---|---|
| Example 19 | PARAPLEK G-30 (Manufactured by C.P. HALL) + A-1 | — 1.43 | — 2.14 | 800 280 | 10 + 10 | 90 | 87 | 89 | ○ | ○ | 71.0 |
| Example 20 | Adekacizer-PK-170 (Manufactured by Asahi Denka Kogyo K.K. + A-1 | — 1.43 | — 2.14 | — 280 | 10 + 10 | 92 | 88 | 90 | ○ | ○ | 69.5 |
| Example 21 | Adekacizer-PK-1430 (Manufactured by Asahi Denka Kogyo K.K. + A-1 | — 1.43 | — 2.14 | — 280 | 10 + 10 | 89 | 80 | 90 | ○ | ○ | 80.0 |
| Example 22 | Polyethylene glycol 200 | 1.17 | 0.50 | 200 | 20 | 90 | 89 | 88 | ○ | ○ | 79.3 |
| Example 23 | Polyethylene glycol 2000 | 1.17 | 0.50 | 2000 | 20 | 88 | 81 | 85 | ○ | ○ | 81.1 |
| Example 24 | Polyethylene glycol 2000 | 1.17 | 0.50 | 2000 | 10 | 90 | 85 | 86 | ○ | ○ | 82.5 |
| Example 25 | P-4 | 1.63 | 0.94 | 296 | 20 | 87 | 83 | 90 | ○ | ○ | 79.0 |
| Example 26 | P-10 | 1.47 | 0.20 | 384 | 20 | 89 | 83 | 85 | ○ | ○ | 72.5 |
| Example 27 | P-13 | 0.70 | -0.32 | 411 | 20 | 88 | 80 | 88 | ○ | ○ | 81.0 |
| Example 28 | P-16 | 0.73 | 1.31 | 438 | 20 | 89 | 85 | 87 | ○ | ○ | 80.5 |
| Example 29 | P-19 | 1.06 | 5.81 | 533 | 20 | 90 | 86 | 86 | ○ | ○ | 75.6 |

TABLE 14

| No. | Plasticizer No. | (Organic/Inorganic) | Log P value | Molecular weight | Adding amount y(g) | Gloss degree at 45° C. White | Gloss degree at 45° C. Grey | Gloss degree at 45° C. Black | Glossiness | Photographic | Flow Starting Temperature (° C.) |
|---|---|---|---|---|---|---|---|---|---|---|---|
| Example 22 | A-1 | 1.43 | 2.14 | 280 | 20 | 91 | 87 | 89 | ○ | ○ | 75.0 |
| Example 23 | A-12 | 1.25 | 0.47 | 285 | 20 | 93 | 80 | 89 | ○ | Δ | 73.0 |
| Example 24 | A-23 | 2.08 | 5.34 | 404 | 20 | 89 | 85 | 90 | ○ | ○ | 66.1 |
| Example 25 | PARAPLEK G-30 (Manufactured by C.P. HALL) + A-1 | — 1.43 | — 2.14 | 800 280 | 10 + 10 | 92 | 86 | 92 | ○ | ○ | 70.9 |

TABLE 14-continued

| No. | Plasticizer No. | (Organic/Inorganic) | Log P value | Molecular weight | Adding amount y(g) | Gloss degree at 45° C. White | Gloss degree at 45° C. Grey | Gloss degree at 45° C. Black | Glossiness | Photographic | Flow Starting Temperature (° C.) |
|---|---|---|---|---|---|---|---|---|---|---|---|
| Example 26 | Polyethylene glycol 200 | 1.17 | 0.50 | 200 | 20 | 90 | 83 | 89 | ○ | ○ | 70.0 |
| Comparative example 5 | None | — | — | — | — | 90 | 76 | 88 | Δ | X | 97.9 |
| Comparative example 6 | A-16 | 7.69 | 22.5 | 771 | 20 | 90 | 70 | 87 | X | X | 82.7 |

The support C was used for preparing the image receiving materials for electrophotography shown in Table 15.

After printing process, the gloss degree at 45. was measured by using a glossmeter. Table 12 to 16 showed results

TABLE 15

| No. | Plasticizer No. | (Organic/Inorganic) | Log P value | Molecular weight | Adding amount y(g) | Gloss degree at 45° C. White | Gloss degree at 45° C. Grey | Gloss degree at 45° C. Black | Glossiness | Photographic | Flow Starting Temperature (° C.) |
|---|---|---|---|---|---|---|---|---|---|---|---|
| Example 27 | A-1 | 1.43 | 2.14 | 280 | 20 | 90 | 83 | 90 | ○ | ○ | 75.1 |
| Example 28 | A-12 | 1.25 | 0.47 | 285 | 20 | 89 | 74 | 90 | Δ | ○ | 72.9 |
| Example 29 | A-23 | 2.08 | 5.34 | 404 | 20 | 89 | 80 | 91 | ○ | ○ | 65.9 |
| Example 30 | PARAPLEK G-30 (Manufactured by C. P. HALL) + A-1 | — 1.43 | — 2.14 | 800 280 | 10 + 10 | 88 | 82 | 87 | ○ | ○ | 70.8 |
| Example 31 | Polyethylene glycol 200 | 1.17 | 0.50 | 200 | 20 | 90 | 79 | 89 | ○ | ○ | 69.7 |
| Comparative example 7 | None | — | — | — | — | 90 | 61 | 90 | Δ | x | 98.0 |
| Comparative example 8 | A-16 | 7.69 | 22.5 | 771 | 20 | 90 | 55 | 85 | x | x | 82.9 |

The support D was used for preparing the image receiving materials for electrophotography shown in Table 16.

of measuring the same positions with respect to images of white, grey and black. Table 12 to 16 also showed results of

TABLE 16

| No. | Plasticizer No. | (Organic/Inorganic) | Log P value | Molecular weight | Adding amount Y(g) | Gloss degree at 45° C. White | Gloss degree at 45° C. Grey | Gloss degree at 45° C. Black | Glossiness | Photographic | Flow Starting Temperature (° C.) |
|---|---|---|---|---|---|---|---|---|---|---|---|
| Example 32 | A-1 | 1.43 | 2.14 | 280 | 20 | 89 | 77 | 88 | ○ | ○ | 75.2 |
| Example 33 | A-12 | 1.25 | 0.47 | 285 | 20 | 88 | 79 | 90 | ○ | Δ | 73.1 |
| Example 34 | A-23 | 2.08 | 5.34 | 404 | 20 | 85 | 65 | 86 | Δ | ○ | 65.8 |
| Example 35 | PARAPLEK G-30 (Manufactured by C.P. HALL) + A-1 | — 1.43 | — 2.14 | 800 280 | 10 + 10 | 88 | 79 | 87 | ○ | ○ | 70.9 |
| Example 36 | Polyethylene glycol 200 | 1.17 | 0.50 | 200 | 20 | 90 | 78 | 88 | ○ | ○ | 69.8 |
| Comparative example 9 | None | — | — | — | — | 90 | 50 | 87 | X | X | 98.0 |
| Comparative example 10 | A-16 | 7.69 | 22.5 | 771 | 20 | 91 | 41 | 92 | X | X | 83.1 |

Test Examples

The prepared image receiving material for electrophotography was cut out to be A4 size and the size of 11 inches 0.17 inches. The A4 size sheets were set on color laser printers (Color Laser Window 3320 PS manufactured by Fuji Xerox Co., Ltd.), and the sheets of 11 inches 0.17 inches were set on color printers (DocuColor 5750 manufactured by Xerox Co., Ltd.). Images from computers were printed on the respective sheets. The images printed included four types, that is, white, grey (image: R=G=B=50%), black, and a woman portrait.

glossiness evaluations where indicated 15 or lower of the difference of the three gloss degrees, indicated 30 or lower, and indicated over 30. Table 12 to 16 further showed results of evaluations of the images of the woman portrait where indicated that 25 or more among 30 persons judged the image as preferable, indicated that 20 or more judged the image as preferable, and indicated that less than 20 judged the image as preferable.

Each example of the invention had good conditions with respect to image roughness, removal and fragility. In addition, each example, after printed, was able to be printed again on its back surface.

In addition, printings were made on the image receiving materials for electrophotography manufactured in Examples and Comparative examples by using commercially available color laser printers, more specifically, a full-color laser printer (A color 629) manufactured by Fuji Xerox Co., Ltd., LP. 8000C manufactured by Seiko Epson Corporation, COLOR PAGEPRESTO N4. ST manufactured by Casio Denshi Kogyo, COLOR LASER SHOT LBP. 2030 manufactured by Canon Inc., magicolor2 manufactured by QMS Japan K.K., color LaserBit KL. 201 manufactured by Konica Corporation, JX. 8200 manufactured by Sharp Corporation, BEAMSTAR. RW manufactured by Hitachi, Ltd., and Color Page Pro POWER SUPPLY manufactured by Minolta Co., Ltd, and the same results were gained as shown in Table 12 to 16.

Flow starting temperatures of the toner image receiving layers of the image receiving materials for electrophotography manufactured in Examples and Comparative examples are measured as follows. Toner image receiving layers of the manufactured image receiving materials were cut off and crushed finely in a mortar, and subjected to vacuum drying. The samples were treated with a flow tester CFT. 500 D model manufactured by Shimidzu Corporation using a die (nozzle) having a diameter of 0.5 mm and a thickness of 1.0 mm under conditions of an extrusion load application of 50 kg and initial set temperature of 50° C. After preheating time of 300 seconds, a stroke of a piston was measured at each temperature while temperature was uniformly up at a rate of 5° C. per minute, and consequently a temperature at which a flow starts was designated as flow starting temperature (Temperature at D in FIG. 1). The results were shown in Table 12 to 16.

The toner resins of the color laser printer (Color Laser Window 3320 PS) manufactured by Fuji Xerox Co., Ltd., and the color Copiers (DocuColor 5750) manufactured by Xerox Co., Ltd. were measured, and as a result, the toner resin of the Color Laser Window 3320 PS had flow starting temperatures of 73.6° C., 73.5° C., 74.0° C., and 73.9° C. in yellow, magenta, cyan and black respectively in this order and the toner resin of the DocuColor 5750 had flow starting temperatures of 74.8° C., 74.1° C., 76.2° C., and 73.9° C. in the same order mentioned above.

Using an image receiving material for electrophotography of the invention having a toner image receiving layer with a flow starting temperature lower than the temperature of a flow starting temperature of toner resin+10° C. can provide formation of toner reflected images similar to photographs with respect to smoothness (glossiness) and also provide no image degradation by image roughness or removal. Consequently, the image receiving material for electrophotography of the invention can be in wide use for photography applications.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An electrophotographic image receiving material having, on a support, one or more structural layers including a toner image receiving layer, wherein at least one layer of said structural layers comprises plasticizer, and wherein a flow starting temperature of said toner image receiving layer is at 30° C. or higher, and lower than a flow starting temperature of toner resin+10° C.

2. The image receiving material for electrophotography according to claim 1, wherein said plasticizer has a flow starting temperature of 30° C. to 90° C.

3. The image receiving material for electrophotography according to claim 1, wherein said plasticizer has a flow starting temperature of 35° C. to 85° C.

4. The image receiving material for electrophotography according to claim 1, wherein said plasticizer has a logP value of 20 or lower.

5. The image receiving material for electrophotography according to claim 4, wherein said plasticizer has a logP value of 15 or lower.

6. The image receiving material for electrophotography according to claim 5, wherein said plasticizer has a logP value of −70 to 15.

7. The image receiving material for electrophotography according to claim 1, wherein said plasticizer has an (organic/inorganic) value of 6 or lower.

8. The image receiving material for electrophotography according to claim 7, wherein said plasticizer has an (organic/inorganic) value of −20 to 6.

9. The image receiving material for electrophotography according to claim 1, wherein said plasticizer has a molecular weight of 150 to 20000.

10. The image receiving material for electrophotography according to claim 9, wherein said plasticizer has a molecular weight of 200 to 10000.

11. The image receiving material for electrophotography according to claim 10, wherein said plasticizer has a molecular weight of 300 to 10000.

12. The image receiving material for electrophotography according to claim 1, wherein said plasticizer has a melting point of 300° C. or lower.

13. The image receiving material for electrophotography according to claim 12, wherein said plasticizer has a melting point of −100° C. to 250° C.

14. The image receiving material for electrophotography according to claim 12, wherein said plasticizer has a melting point of −100° C. to 200° C.

15. The image receiving material for electrophotography according to claim 1, wherein said plasticizer has a glass transition temperature of 250° C. or lower.

16. The image receiving material for electrophotography according to claim 15, wherein said plasticizer has a glass transition temperature of −100° C. to 200° C.

17. The image receiving material for electrophotography according to claim 16, wherein said plasticizer has a glass transition temperature of −50° C. to 150° C.

18. The image receiving material for electrophotography according to claim 1, wherein said plasticizer has a partial structure derived from ethylene oxide or propylene oxide.

19. The image receiving material for electrophotography according to claim 1, wherein said tonor image forming layer comprises said plasticizer.

20. The image receiving material for electrophotography according to claim 1, wherein said toner image receiving layer comprises one or more additives selected from a group consisting of plasticizer, charge controlling agent, electroconductive metal oxide, fluoroorganic compound and additives for photography.

* * * * *